Figure 1:
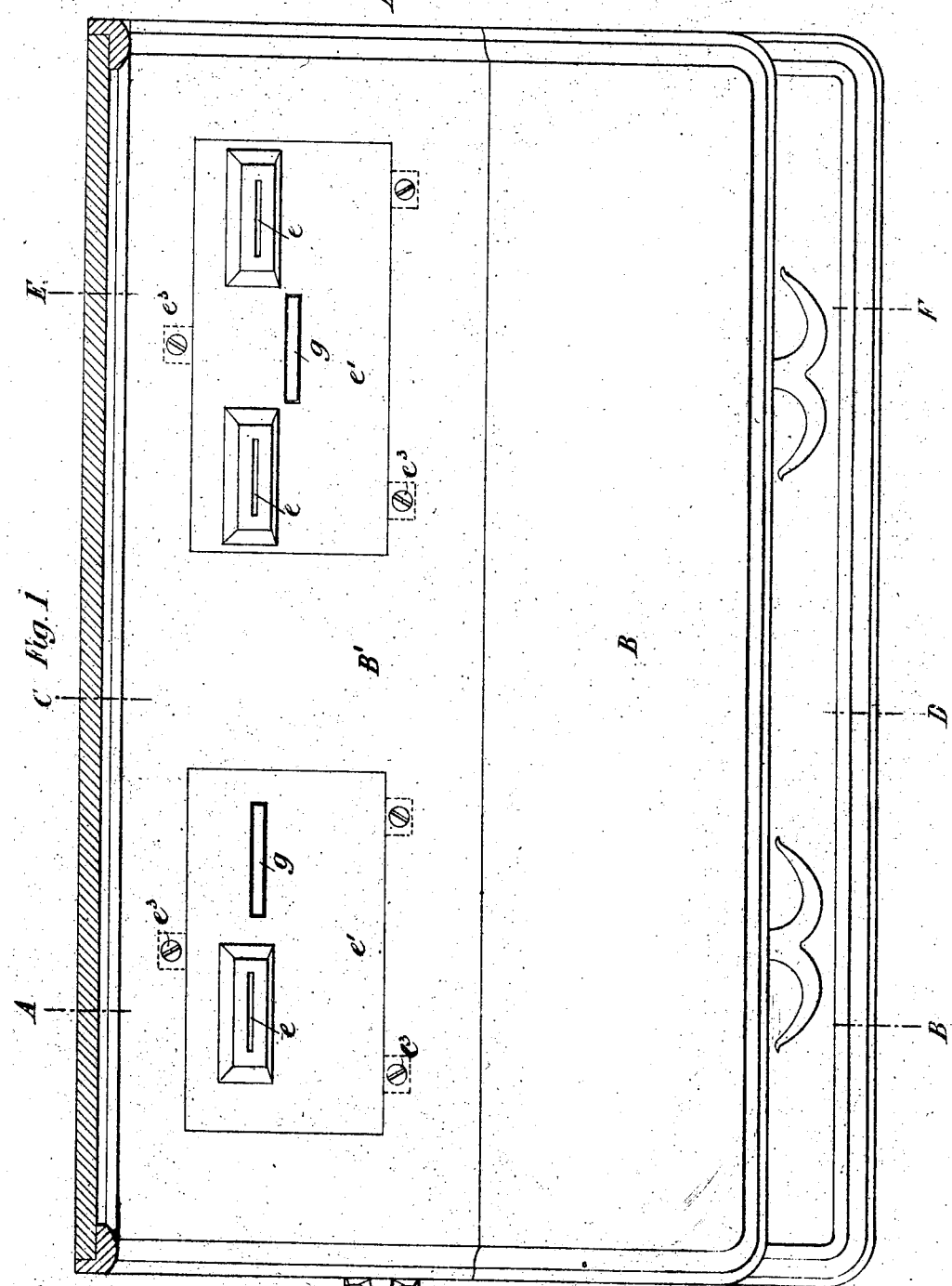

(No Model.)
10 Sheets—Sheet 1.

P. EVERITT.
AUTOMATIC VENDING APPARATUS.

No. 374,297.  Patented Dec. 6, 1887.

Witnesses:
Will T. Norton.
Daniel Scott.

Inventor:
Percival Everitt,
by John J. Halsted & Son
his Attys.

(No Model.) 10 Sheets—Sheet 3.

P. EVERITT.
AUTOMATIC VENDING APPARATUS.

No. 374,297. Patented Dec. 6, 1887.

Witnesses:
Will T. Norton.
Daniel Scott.

Inventor:
Percival Everitt.
by John J. Halsted
his Attys.

(No Model.)
P. EVERITT.
AUTOMATIC VENDING APPARATUS.
No. 374,297. Patented Dec. 6, 1887.
10 Sheets—Sheet 4.
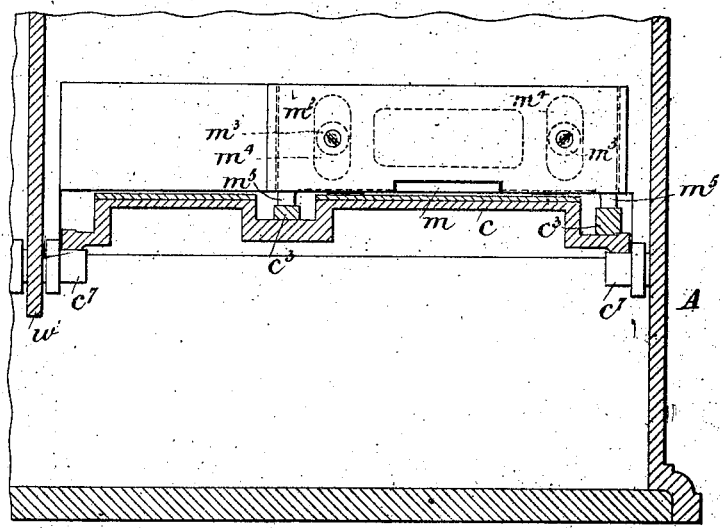
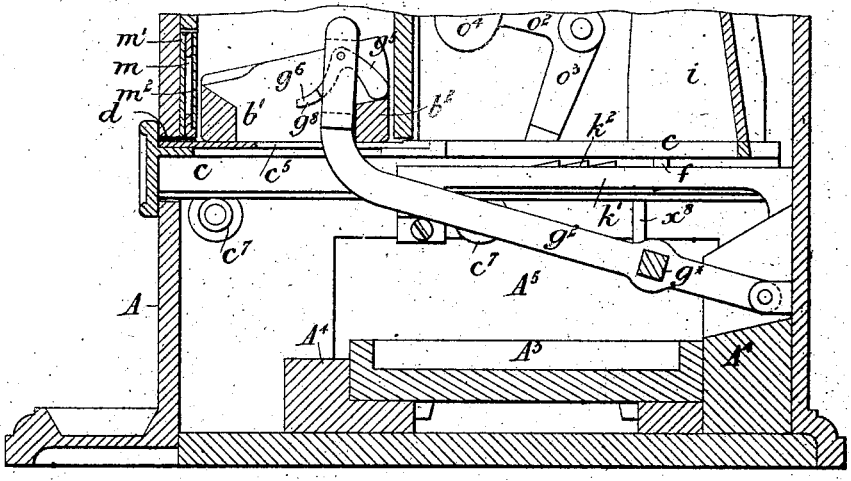
Witnesses:
Will T. Norton
Daniel Scott
Inventor:
Percival Everitt
by John J. Halsted & Son
his Attys.

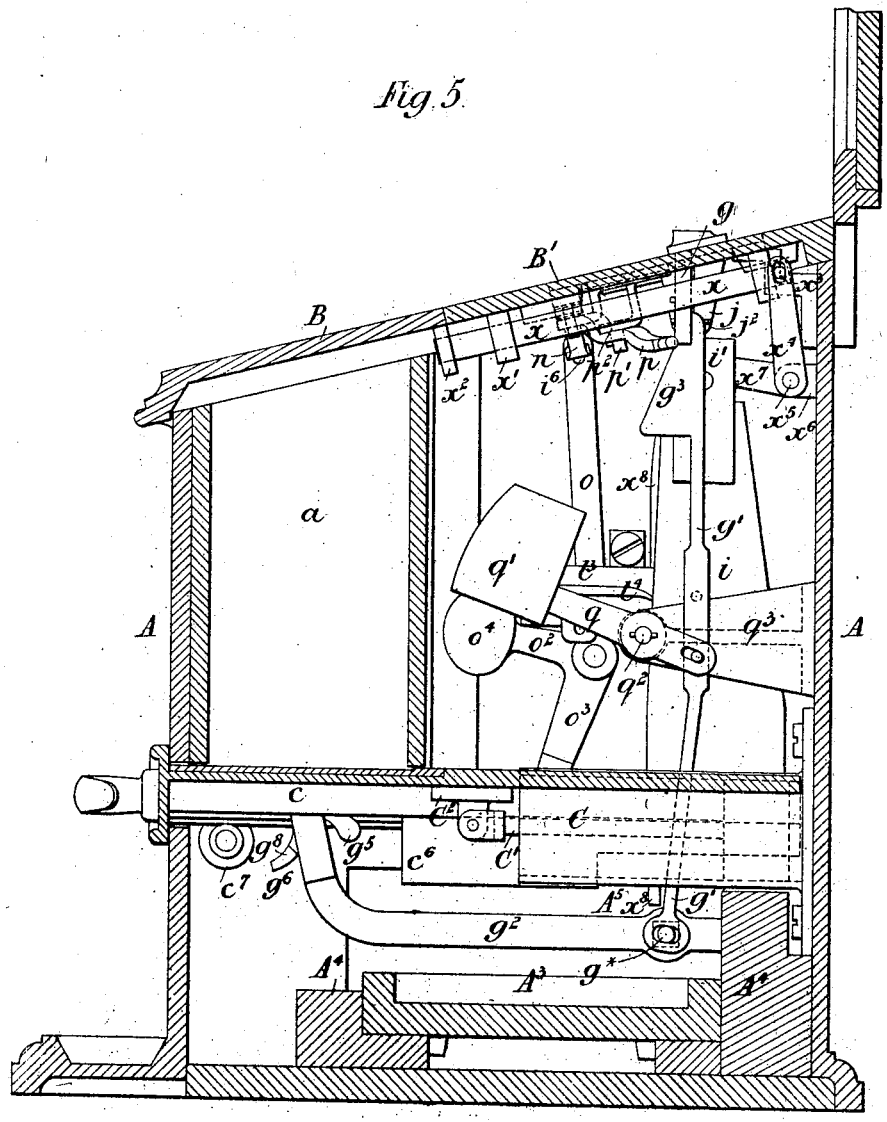

(No Model.) 10 Sheets—Sheet 6.
P. EVERITT.
AUTOMATIC VENDING APPARATUS.
No. 374,297. Patented Dec. 6, 1887.

Witnesses:
Will T. Norton
Samuel Scott

Inventor:
Percival Everitt,
by John J. Halsted & Son
his Attys.

(No Model.)

P. EVERITT.
AUTOMATIC VENDING APPARATUS.

No. 374,297. Patented Dec. 6, 1887.

(No Model.) 10 Sheets—Sheet 8.

P. EVERITT.
AUTOMATIC VENDING APPARATUS.

No. 374,297. Patented Dec. 6, 1887.

Witnesses:
Will T. Norton
Daniel Scott

Inventor:
Percival Everitt
by John J. Halsted
his Attys (No Model.) 10 Sheets—Sheet 9.
P. EVERITT.
AUTOMATIC VENDING APPARATUS.

No. 374,297. Patented Dec. 6, 1887.

(No Model.) 10 Sheets—Sheet 10.

P. EVERITT.
AUTOMATIC VENDING APPARATUS.

No. 374,297. Patented Dec. 6, 1887.

Witnesses:
Will T. Norton
Daniel Pott

Inventor:
Percival Everitt
By his Attorney
John J. Halsted Jr.

ically.
UNITED STATES PATENT OFFICE.

PERCIVAL EVERITT, OF LONDON, ENGLAND, ASSIGNOR TO THE AUTOMATIC SELLING MACHINE COMPANY, OF NEW YORK.

AUTOMATIC VENDING APPARATUS.

SPECIFICATION forming part of Letters Patent No. 374,297, dated December 6, 1887.

Application filed August 10, 1886, Serial No. 210,539. (No model.) Patented in England September 2, 1885, No. 10,406; in Germany July 20, 1886, No. 39,327; in France July 28, 1886, No. 177,649; in Belgium August 3, 1886, No. 74,091; in Victoria August 16, 1886, No. 4,672; in Canada August 20, 1886, No. 24,765; in India September 10/21, 1886, No. 1,192; in Italy September 30, 1886, XX, 20,512, XLI, 31; in Austria-Hungary October 31, 1886, No. 30,913 and No. 55,716; in Cape of Good Hope November 1, 1886, No. 367/6/595; in South Australia November 4, 1886, No. 736; in Tasmania November 6, 1886, No. 435/9; in Queensland November 8, 1886, No. 190; in New Zealand November 10, 1886, No. 2,107; in Spain November 20, 1886, No. 10,116; in New South Wales December 22, 1886, No. 1,979; in Brazil January 8, 1887, No. 424; in the Argentine Republic January 19, 1887, No. 568; in Natal February 22, 1887; in Norway February 26, 1887, No. 498; in Luxemburg April 23, 1887, No. 839, and in Portugal August 4, 1887, No. 1,157.

*To all whom it may concern:*

Be it known that I, PERCIVAL EVERITT, a subject of the Queen of Great Britain, residing at London, England, have invented new and useful Improvements in Apparatus for Receiving Payment for and for Delivering Prepaid Goods, (patented to me in Great Britain, No. 10,406, A. D. 1885; in Germany, No. 39,327, dated July 20, 1886; in France, No. 177,649, dated July 28, 1886; in Belgium, No. 74,091, dated August 3, 1886; in Victoria, No. 4,672, dated August 16, 1886; in Canada, No. 24,765, dated August 20, 1886; in India, No. 1,192, dated September 10/21, 1886; in Italy, Vol. XX, No. 20,512, Vol. XLI, No. 31, dated September 30, 1886; in Austria-Hungary, Nos. 30,913 and 55,716, dated October 31, 1886; in Cape of Good Hope, Register No. 367, No. 6/595, dated November 1, 1886; in South Australia, No. 736, dated November 4, 1886; in Tasmania, No. 435/9, dated November 6, 1886; in Queensland, No. 190, dated November 8, 1886; in New Zealand, No. 2,107, dated November 10, 1886; in Spain, Fol. 57-5°, No. 10,116, dated November 20, 1886; in New South Wales, Letters of Registration, No. 1,979, dated December 22, 1886; in Brazil, No. 424, dated January 8, 1887; in Argentine Republic, No. 568, dated January 19, 1887; in Natal, dated February 22, 1887; in Norway, No. 498, dated February 26, 1887; in Luxemburg, No. 839, dated April 23, 1887, and in Portugual, No. 1,157, dated August 4, 1887,) of which the following is a specification.

This invention relates to further improvements in that class of apparatus for delivering prepaid goods for which Letters Patent were granted to John Glas Sandeman and myself, No. 323,213, dated the 28th day of July, 1885. In apparatus constructed according to the specification of the said Letters Patent No. 323,213, it has been found in practice that although the apparatus is perfectly successful when not designedly misused, articles such as pieces of paper, orange-peel, and other rubbish have been maliciously placed in the slit provided for the admission of the coin, and that in consequence the channel provided for the passage of the coins from the slit became blocked, so that if a coin were subsequently inserted in the slit the apparatus would not act and the person attempting to use the apparatus could not obtain the post-card or other article for which he had paid by inserting a proper coin in the slit of the apparatus. It has also been found that by maliciously manipulating the delivery-slide in a manner which it is not necessary or expedient to state it is occasionally possible to obtain by the insertion of one coin more than one article.

The present improvements have for their object the rendering the apparatus more secure against such misuse.

In carrying out these improvements I construct the improved apparatus substantially in the manner described in the specification of the said former Letters Patent, in so far as regards the skeleton frame or box of suitable shape to contain the articles to be delivered, and in which the goods are placed one on the top of the other, the said skeleton frame or box being placed over a delivery-slide fitted with a plate or backing-piece of about the thickness of the article to be delivered, an aperture being provided in front of the box of a size to allow of only one article being drawn out at a time. The delivery-slide is locked until a coin or coins of the proper denomination is or are placed in a slit or slits, when the delivery slide or slides will on an attempt to move it or them out be found to be unlocked and can be moved out when pulled or pushed, whereupon the coin will fall into the money-drawer as soon as the delivery-slide shall have traveled a sufficient distance to allow of the locking-bolt being withheld from falling.

In order to prevent the blocking of the apparatus, instead of employing a zigzag vertical channel, as described in the specification of the said former Letters Patent, down which the coin traveled, I now connect with the delivery-slide itself an upright or uprights having fitted to the top part thereof a jaw or support with an opening of a width regulated by the diameter of the coin required to work the apparatus. This jaw or support stands at such a distance below the slit through which the coin is introduced that the coin is allowed to fall just far enough to clear the top of the box or apparatus, and is there held sidewise by means of proper guides. Carried by the said upright or uprights is a spindle which runs somewhat behind the coin, and is provided with a finger or trigger which can be caused to press against the said coin. On the said spindle is an arm having a rod hung on its extremity and extending downward through the delivery-slide and engaging in a series of rack-teeth attached to the frame or box of the apparatus and forming the lock. This rod has a projection on it, the use of which is hereinafter explained. On the side of the box and forward of the lock-bolt and the projection thereon is a plate running the same distance as the above-named rack-teeth.

In order to prevent more than one article being procured for the payment of the one amount which unlocks the drawer, I combine with the rack what I term a "drop-plate" in the front of the aperture, (which allows egress for only one article at a time.) This drop-plate consists of a plate extending the width of the article to be delivered, and having a projecting piece or projecting pieces at each end engaging onto a wedge or wedges on the delivery-slide. This drop-plate is free to move up and down in a guide to keep it vertical.

The apparatus is fitted with an arrangement similar to the one described in the specification of the said former Letters Patent for closing, by the action of pulling out the delivery-slide, the slit in which the coin is placed; but I slightly modify the levers, so that should an attempt be made to open the delivery-slide by means of a knife or similar instrument the knife will be nipped, and thus prevent the opening of the drawer.

The arrangement for indicating when the box is empty is also similar to that described in the specification of the said former patent, except that the levers require to be slightly different, owing to the shape of the box.

In order to enable my invention to be fully understood, I will proceed to describe the same by reference to the accompanying drawings, in which—

Figure 2:
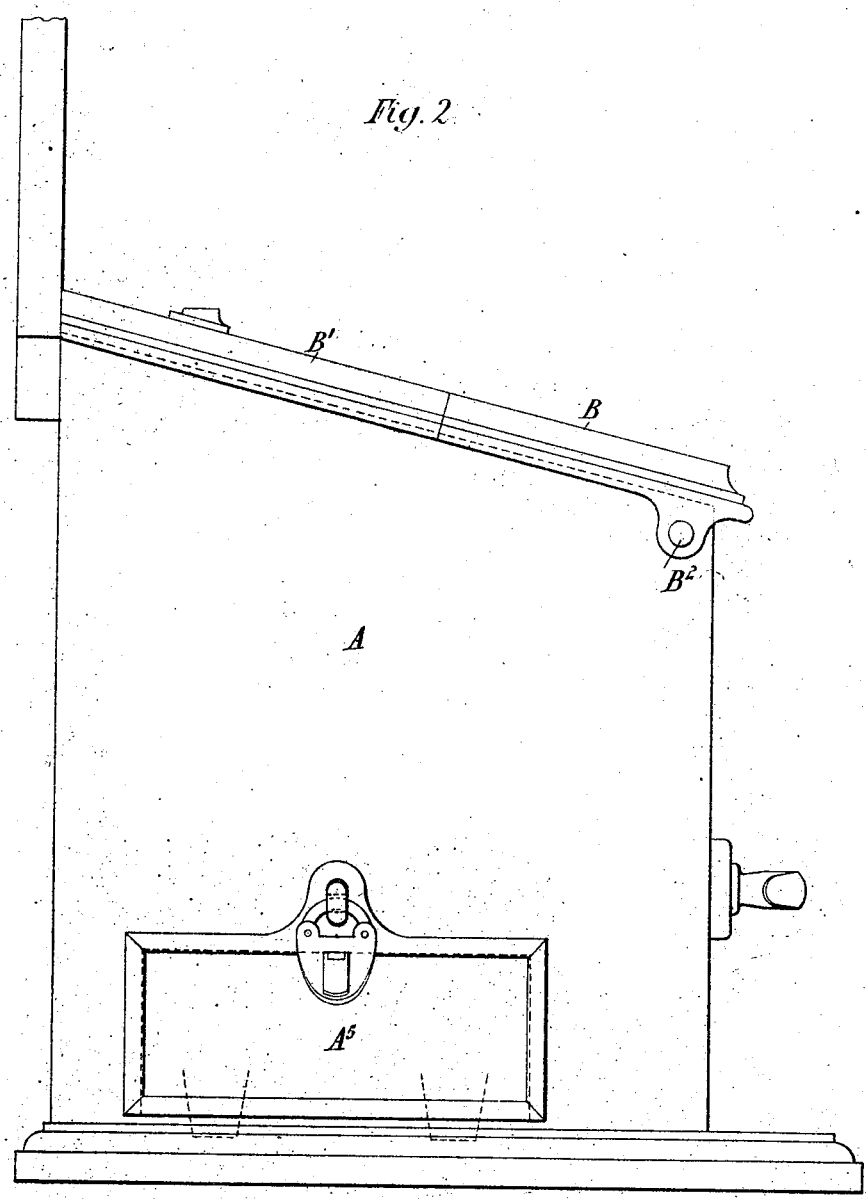
Figure 3:
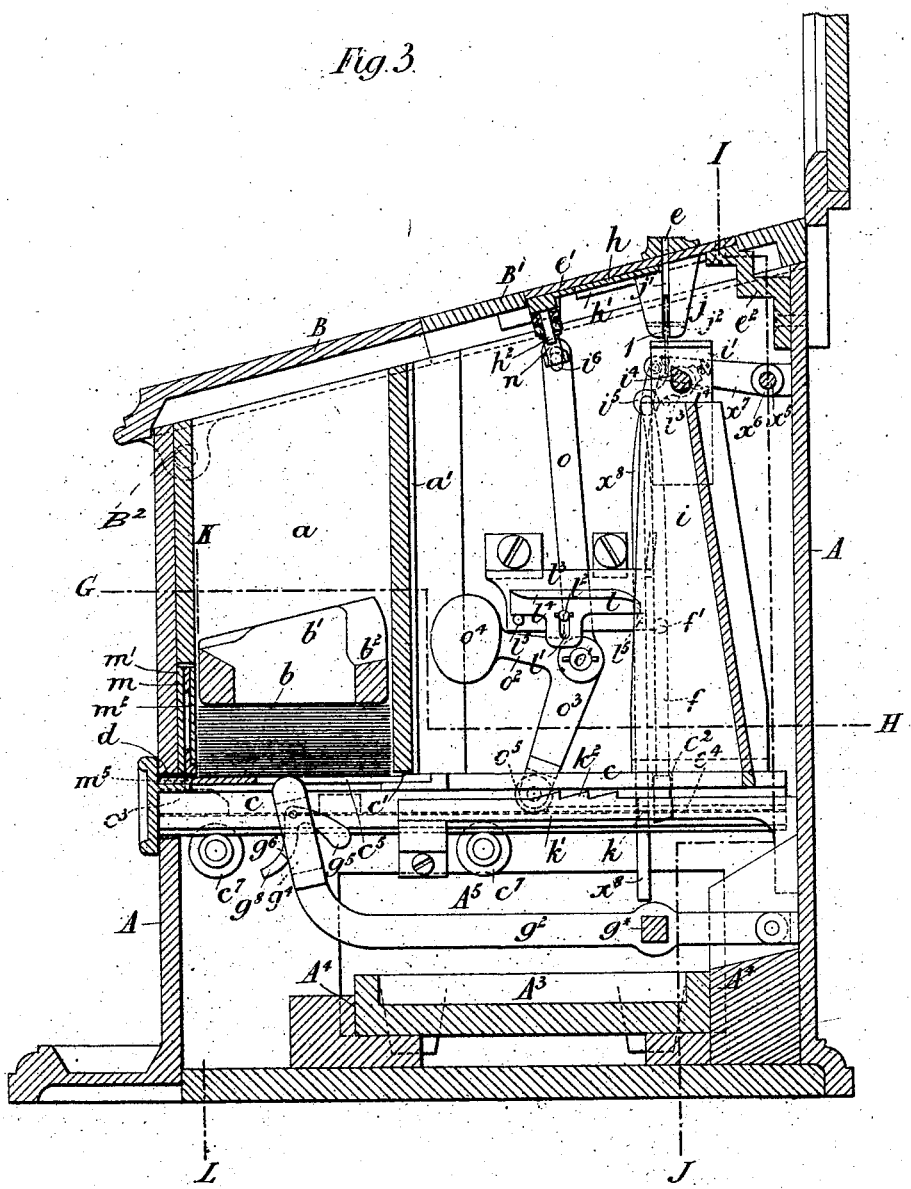
Figure 6:
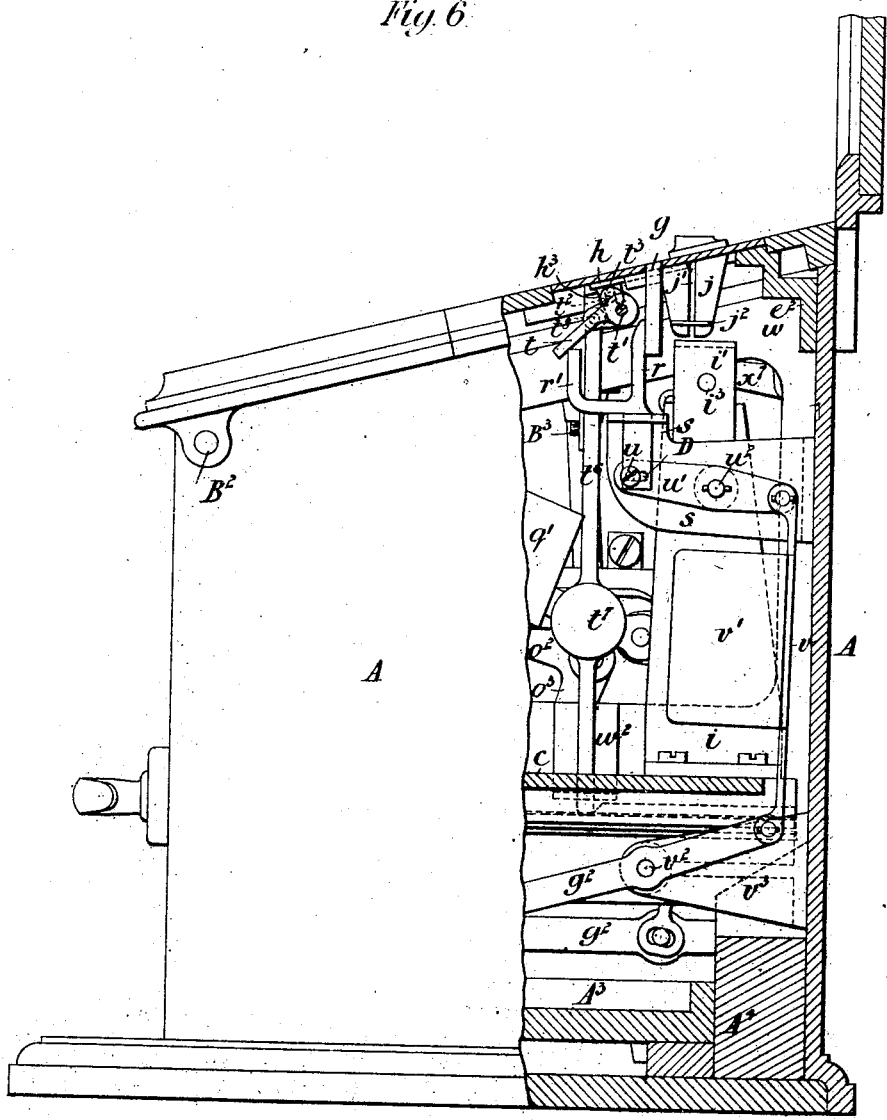
Figure 7:
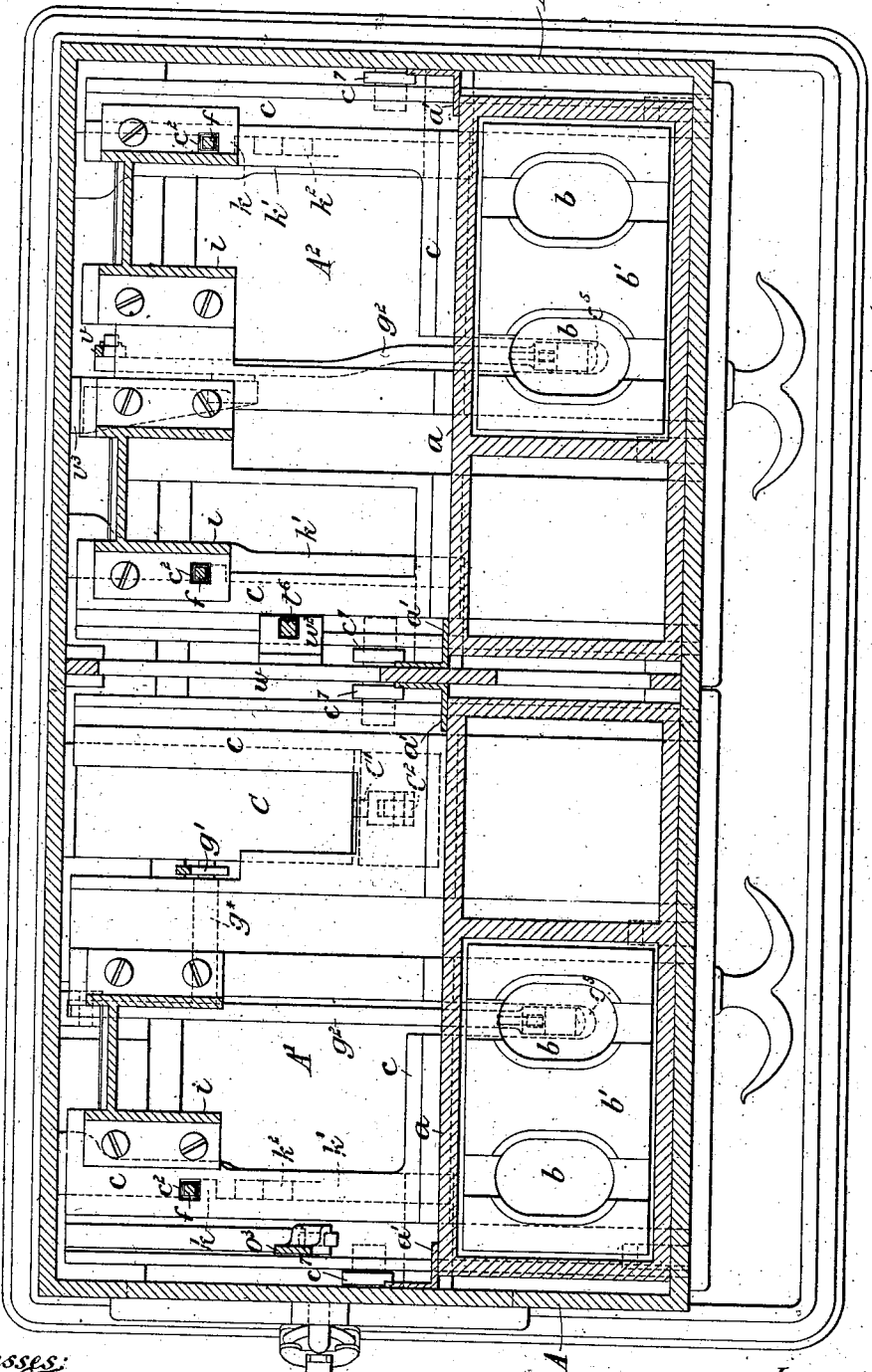
Figure 8:
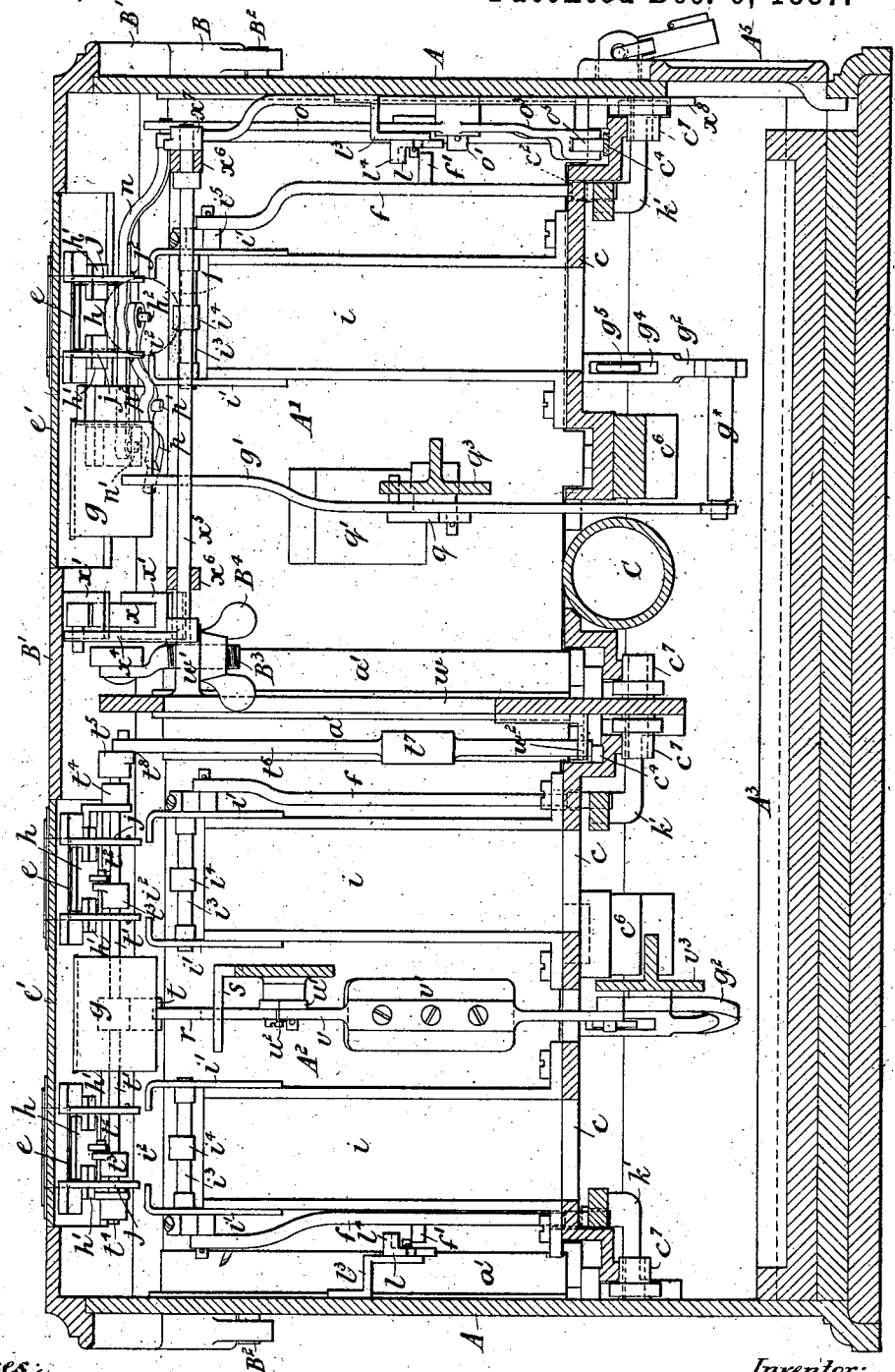
Figure 10:
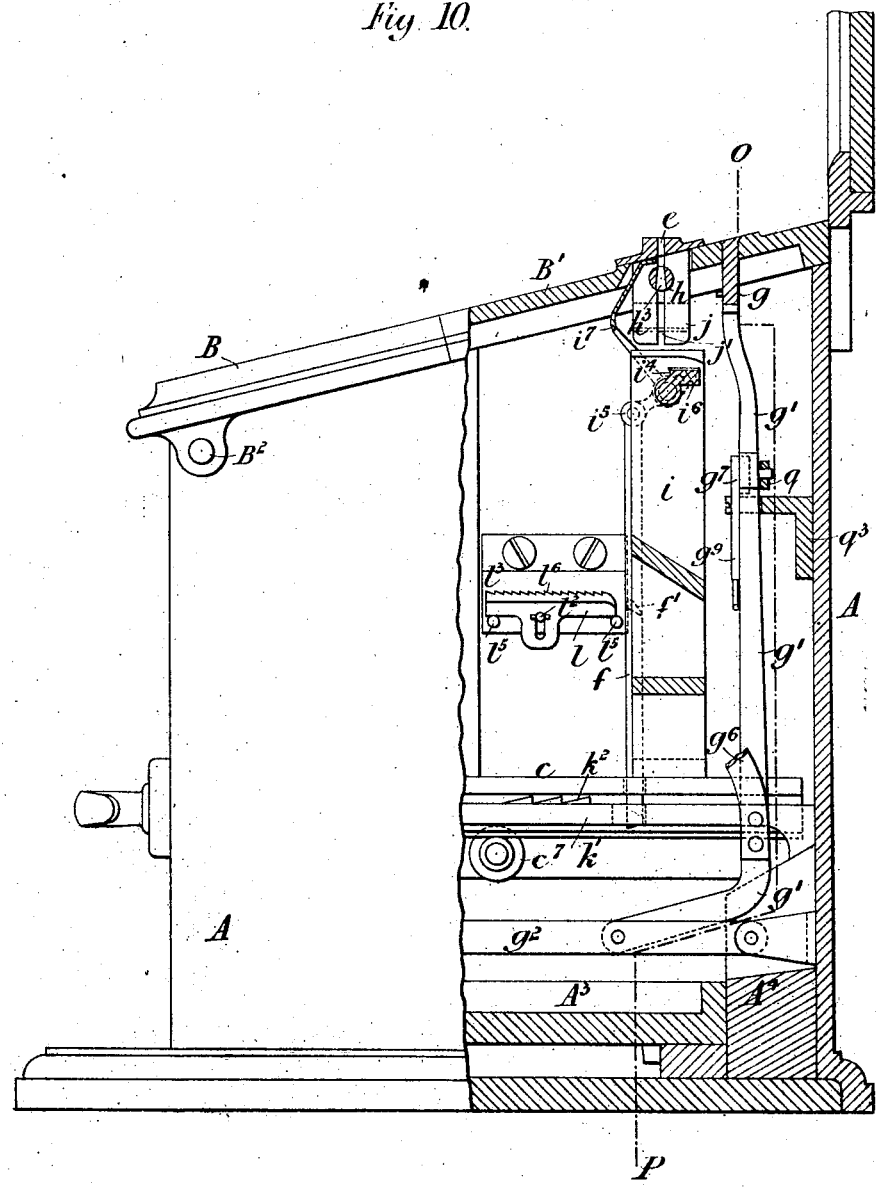

Figure 1 represents a plan of an apparatus for receiving payment for and for delivering prepaid goods constructed according to my present improvements, the said apparatus being shown divided into two portions, one portion being adapted for the delivery of post-cards and the other portion for the delivery of a stamped envelope inclosing a blank sheet of note-paper. Fig. 2 represents an elevation of the left-hand side of the same. Fig. 3 represents a vertical section on the line A B of Fig. 1, looking toward the left-hand side of the apparatus; and Fig. 4 represents a portion of the view illustrated in Fig. 3, but showing part of the mechanism in a different position. Figs. 5 and 6 represent a vertical section and a side elevation, partly in section, the sections being taken on the lines C D and E F, respectively, of Fig. 1, looking in the same direction as in Figs. 3, 4, 5, and 6. Fig. 7 represents a horizontal section on the crooked line G H of Fig. 3. Fig. 8 represents a vertical section on the crooked line I J of Fig. 3, looking toward the front of the apparatus. Fig. 9 represents a vertical section on the line K L of Fig. 3, looking in the same direction as in the previous figure. In Fig. 10 I have shown my improved apparatus for delivering prepaid goods, with some of the parts somewhat modified, the said figure representing a right-hand side elevation, partly in section, the section being taken on the line M N of Fig. 11, which represents a vertical section of part of the apparatus on the crooked line O P of Fig. 10, looking toward the front of the said apparatus. Fig. 12 represents a side elevation, partly in section, the section being taken on the crooked line Q R of Fig. 11, looking in the same direction as in Fig. 10.

Similar letters of reference represent similar or corresponding parts throughout the several figures of the accompanying drawings.

Referring to Figs. 1 to 9, A represents the case or box of the apparatus, which case or box, as here shown, is substantially the same as that described in the specification of the said former Letters Patent, and is divided by an open partition, $w$, into two compartments, A' and A². The said compartments A' and A² serve to contain the arrangements of mechanism for delivering post-cards and stamped envelopes, respectively, as hereinbefore mentioned. The said arrangements of mechanism in the two compartments A' and A² are similar to each other, with the exception of slight modifications, rendered necessary by reason of the mechanism in the compartment A² being duplicated to allow of the insertion and operation of two coins instead of one, as is the case with the mechanism in the compartment A'. I will therefore, for the sake of simplicity, confine myself at present to describing the mechanism in the compartment A'.

$a$ is the skeleton frame or box, of suitable shape to contain the articles to be delivered and held in position in guides $a'$, and in which frame or box are contained a number of post-cards, $b$, placed one on top of the other. On the top of the pile of cards is placed a hollow weight, $b'$.

$c$ is the delivery-slide, over which the skeleton frame or box $a$ is placed, the said slide being arranged so as to slide on friction-rollers $c^7$.

$c'$ is the plate or backing-piece on the delivery-slide $c$, the said backing-piece $c'$ projecting above the surface of the delivery-slide to the extent of about the thickness of one of the post-cards which it serves to deliver. On the under side of the delivery-slide $c$ is fixed a stop, $c^6$, which, by coming in contact with the front of the box A, limits the outward movement of the said delivery-slide.

$d$ is the aperture or space in the front of the box A, above the delivery-slide $c$, which aperture is of a size to allow of only one post-card being drawn out each time the delivery-slide $c$ is moved or drawn out.

$e$ is the money-slit, formed in a plate, $e'$, which, as here shown, is fastened by screws to a bracket, $e^2$, secured to the inside of the back of the box A, as shown in Fig. 3, and $f$ is the locking-bolt, which serves to lock the delivery-slide $c$ until a coin of the proper denomination is placed in the money-slit $e$, when the delivery-slide $c$ will, on an attempt to move it out, be found to be unlocked, and can be moved out when pulled.

$g$ is a tablet on which is written the word "Empty," or its equivalent, and which is connected by means of a rod, $g'$, to a lever, $q$, having a weight, $q'$, at one end, and pivoted to a pin, $q^2$, on a bracket, $q^3$. The rod $g'$ is slotted at its lower end, and engages with the end of a pin, $g^*$, projecting at right angles from a lever, $g^2$, the free end of which is bent and passes upward through a slot, $c^5$, in the delivery-slide $c$, and bearing against the underneath face of the bottom post-card in the skeleton frame or box $a$, so that when the post-cards in the box $a$ have been exhausted the said bent end of the lever $g^2$ will move upward, and thereby expose the tablet $g$ to view.

$h$ is a slide, which is arranged below the money-slit $e$, and which, as hereinafter described, is operated to close the said slit when the delivery-slide is pulled out, or when the post-cards are exhausted in the box $a$.

The top of the box A is inclined, and is divided into two parts, B and B', the part B being hinged, as shown at $B^2$ in Figs. 2 and 6, and the part B' held in place by means of a bolt, $B^3$, hinged to the same and passing through a lug, $w'$, on the partition $w$, the said bolt being secured by a winged nut, $B^4$. (See specially Fig. 8.) The said part B' is further held by screws $e^3$ to the plates $e'$, as shown in Fig. 1. $A^3$ is the money-drawer, which works on guides $A^4$ at the bottom of the box A, a door, $A^5$, being arranged at one end of the said box to allow of access to the drawer $A^3$.

All the foregoing parts are substantially the same as the equivalent parts described in the specification of the said former Letters Patent. I will now describe my present improvements in connection therewith.

$i$ is the upright, formed H-shaped in cross-section or of other suitable shape, and connected with the rear end of the delivery-slide $c$, so that when the delivery-slide is in its locked position the said upright is underneath the money-slit $e$, as clearly shown in Fig. 3.

$i^2$ is the jaw or support, fitted to the top part of the upright $i$, the said jaw or support being formed by two angularly-shaped pieces of metal, $i'$, one of which is fixed at each side of the upright $i$, the opening in the jaw or support being of a width regulated by the diameter of the coin 1, (shown in dotted lines in Figs. 3 and 8,) required to work the apparatus. The jaw $i^2$ forms a support for the coin 1, and is at such a distance below the slot $e$, through which the coin is introduced, that the coin is allowed to fall just far enough to clear the under side of the top of the box A.

$j j$ are the guides on each side of the money-slit $e$, and fixed on the under side of the top of the box A, the said guides consisting of plates having vertical slots or recesses $j'$, which serve to guide the coin 1 to the jaw $i^2$, and to there hold it sidewise. The guides $j$ are provided on the outside with small strips of metal, $j^2$, placed across the slots or recesses $j'$, to prevent the coin 1 from falling out sidewise in its descent onto the jaw $i^2$.

$i^3$ is the spindle carried in the sides of the upright $i$, the said spindle running behind the coin 1, as shown in Fig. 3.

$i^4$ is the finger or trigger with which the spindle $i^3$ is provided, which finger or trigger projects in an upward direction and can be caused to press against the coin 1 in the manner hereinafter described.

$i^5$ is the arm or lever fixed to the spindle $i^3$, the rod or locking-bolt $f$ being connected to or hanging from the outer end of the said arm or lever, and extending downward through a hole, $c^2$, in the delivery-slide $c$, and into a notch, $k$, in a bracket, $k'$. $k^2 k^2$ are the rack-teeth in the bracket $k'$, which is attached to the frame or box A of the apparatus and forms the lock, and with which teeth the rod or locking-bolt $f$ engages, as hereinafter described.

$f'$ is a projection on the rod or locking-bolt $f$, and $l$ is the loose plate on the other side of the box or compartment A, and near the lock-bolt $f$ and projection $f'$ thereon, the projection $f'$ serving, as hereinafter explained, to engage with the loose plate $l$, in which is a slot, $l'$, through which passes a pin, $l^2$, on a bracket, $l^3$, fastened to the side of the box A.

The plate $l$ extends for about the same distance as the rack-teeth $k^2$ and notch $k$, and has a projecting flange, $l^4$, the ends of the upper and under sides of which are curved in opposite directions, as shown in Fig. 3. The ends of the plate $l$ rest on pins $l^5$, fixed to the bracket $l^3$. In order to obtain a post-card by this arrangement, assuming the locking-bolt $f$ to be down and the delivery-slide shut, as shown in Fig. 3, if a proper coin be placed in the slit $e$ it will rest by its periphery on the jaw or support $i^2$, above referred to, and, being held sidewise by the guides $j$, is there fixed. A little slack is allowed in the notch $k$ of the lock, so as to allow of the delivery-slide being pulled forward a short distance together with the jaws or supports $i^2$, which will slide under the coin 1, the finger or trigger $i^4$ on the spindle $i^3$ coming in contact with the coin 1, thereby causing the spindle $i^3$ to make a partial rotation, so as to raise the arm or lever $i^5$, carrying the locking-bolt $f$, out from the notch $k$ in the rack $k^2$ below, and to pass the projection $f'$ thereon onto the upper side of the flange $l^4$ on the loose plate $l$. At the same time the lowermost post-card in the box or frame $a$ will be pushed forward by the backing-piece $c'$ on the delivery-slide $c$ in a similar manner to that described in the specification of the said former Letters Patent. On moving the delivery-slide $c$ farther out the coin 1 will be deprived of its support and will fall into the money-drawer $A^3$, and the locking-bolt $f$ would move, so as to engage with the rack-teeth of the rack $k'$, were it not held by the projection $f'$ on it resting on the flange $l^4$ of the plate $l$. On the delivery-slide being now moved out to its full extent the purchaser is then enabled to obtain a post-card, and the projection $f'$ on the locking-bolt $f$ will become unsupported, so that in the return journey of the delivery slide $c$ the said projection passes under the loose plate $l$ and engages in the rack-teeth of the rack $k'$. The unlocking arrangement having thus been described, it will be obvious that the choking of the apparatus will be prevented, because any article larger than the coin 1 is prevented by the size of the slit $e$ from being entered, and any article smaller than the said coin will be too small to be retained in the jaw or support $i^2$, and will fall straight through into the drawer $A^3$. Should, however, the jaw or support $i^2$, through accident or otherwise, become blocked, the slit $e$ will be blocked and no more coins can be inserted.

$m$, Figs. 3 and 9, is the drop-plate in the front of the aperture $d$, and which, in combination with the rack $k'$, serves to allow of egress for only one post-card at a time and to prevent more than one post-card being procured for the payment of the one amount or coin which unlocks the drawer. The drop-plate $m$ extends across the aperture above the delivery-slide $c$.

$m^5$ $m^5$ are projecting pieces, one at each end of the plate $m$, and $c^3$ are wedges or inclined surfaces on the delivery-slide $c$, as shown clearly in Fig. 9, onto which the projecting pieces $m^5$ engage.

$m'$ and $m^2$ are the two plates forming the guide, in which the drop-plate $m$ is free to move up and down in a vertical direction. The plates $m'$ and $m^2$ are kept a sufficient distance apart by means of bosses or distance-pieces $m^3$ on the plate $m'$, the said bosses passing through slots $m^4$ in the said plate $m$. Its action is as follows: When the delivery-slide $c$ is shut, the wedges or inclined surfaces $c^3$ on the slide $c$ engage with the projecting pieces $m^5$ on the plate $m$ and raise it sufficiently to allow the passage of the post-card. When, on moving out the slide $c$, the post-card has passed some little distance under the drop-plate $m$, the wedges or inclined surfaces $c^3$ terminate and allow the plate $m$ to rest on the top of the post-card. On the post-card being taken away the plate $m$ falls onto the delivery-slide $c$ itself, thus completely closing the aperture $d$, and on the reclosing of the delivery-slide $c$ the locking-bolt $f$ will have engaged with the rack-teeth $k^2$ before the wedges or inclined surfaces $c^3$ have commenced to lift the drop-plate $m$, thus rendering it practically impossible to obtain a second post-card without a fresh payment.

The slide $h$ (hereinbefore referred to for closing, by the action of pulling out the delivery-slide, the slit in which the coin is placed) works (see specially Fig. 8) in guides $h'$, fixed to the under side of the top of the box A. The slide $h$ has a pin, $h^2$, fixed to one end and engaging with a slot in the central portion of a lever, $n$, pivoted at one end to a pin, $n'$, and working at the other end in a slot, $i^6$, in a lever, $o$. The lever $o$ is pivoted at $o'$, and is formed with two arms or extensions, $o^2$ $o^3$, provided at their outer ends with a weight, $o^4$, and a roller, $o^5$, respectively. On one side of the delivery-slide $c$ is a ledge or strip, $c^4$, on which the roller $o^5$ of the arm $o^3$ of the lever $o$ runs when the delivery-slide $c$ is moved to open or close the same. The strip $c^4$ is of such a length that when the delivery-slide $c$ is shut the roller $o^5$ is caused by the weight $o^4$ on the arm $o^2$ to rest on the slide $c$ and against the end of the strip $c^4$, as shown in dotted lines at Fig. 3. The slide $h$ is then in the position shown in the said figure and the slit $e$ uncovered. Directly the delivery-slide $c$ is commenced to be moved out (when a coin has been inserted in the slit $e$) the roller $o^5$ is caused to mount and roll on the top of the strip $c^4$, thereby moving the lever $o$ on its pivot $o'$ and the lever $n$ on its pivot $n'$, and causing the slide $h$ to cover the money-slit $e$.

To allow of operating the slide $h$ so as to cover the slit $e$ when the apparatus is exhausted of post-cards, I form (see specially Figs. 5 and 8) the rod $g'$, which carries the tablet $g$, with an inclined portion, $g^3$, which is in contact with one end of a double-ended lever, $p$, pivoted in the center to a pin, $p'$, on a bracket, $p^2$, the other end of the said lever $p$ having a slot through which passes the pin $h^2$ on the slide $h$. By this arrangement it will be seen that when the box $a$ of the apparatus is exhausted of post-cards and the bent end of the lever $g^2$ is thereby caused to ascend through the weight $b'$, (which will then be resting on the top of the delivery-slide $c$,) the rod $g'$ will be also caused to ascend, and the inclined part $g^3$ will move the lever $p$ on its pivot $p'$, thereby moving the slide $h$ across the slit $e$ and covering the same.

The lever $g^2$ is formed at its free end with a slot, $g^4$, in which is pivoted a bell-cranked piece, $g^5$ $g^6$, which is formed with one of its arms, $g^5$, narrower than the slot $g^4$, so that it can move freely through the same, while the other arm, $g^6$, is prevented from doing so, as it is formed with a head or flat portion, $g^8$, wider than the said slot. The end $g^6$ of the bell-cranked piece is heavier than the end $g^5$, so that the former normally rests on or against the lever $g^2$, while the latter projects out from the slot $g^4$ therein. This piece $g^5$ $g^6$ serves, when the box $a$ of the apparatus is exhausted of post-cards, as previously described, to lock the said lever $g^2$ and tablet $g$ (when the bent end of the lever $g^2$ is moved up through the weight $b'$) by reason of the end $g^5$ moving onto the solid portion $b^2$ of the weight $b'$, as clearly shown in Fig. 4, the heavier end, $g^6$, moving the end $g^5$ outward when the latter has been pressed inward in passing the solid portion of the weight.

Instead of the arrangement just described for locking the lever $g^2$ and tablet $g$, I sometimes employ a suitable spring-bolt adapted to take into a slot in or to pass under the tablet $g$ when the latter rises on the cards being exhausted.

In the part or compartment $A^2$ of the apparatus, in consequence of the position of the tablet $g$ being altered and an extra slide $h$ being required, I have found it necessary to somewhat modify the mechanism for operating the same, videlicet: The tablet $g$, as shown in Figs. 6 and 8, is fixed to a bar or rod, $r$, which works in a vertical direction in a bracket, $s$. Fixed to the said bar $r$ is an extension or arm, $r'$, which projects outward and is bent at right angles, the said arm $r'$ supporting a lever, $t$, mounted on a shaft, $t'$, hereinafter described.

The lower end of the bar $r$ is slotted at D, and engages with a pin, $u$, on one end of a lever, $u'$, pivoted at $u^2$ to the bracket $s$, the other end of the lever $u'$ being jointed to a vertical rod, $v$, on which is fixed a weight, $v'$. The lower end of the rod $v$ is jointed to the lever $g^2$, which is pivoted at $v^2$ to a bracket, $v^3$, and works in a similar manner to the lever $g^2$, hereinbefore described when referring to the mechanism in the compartment $A'$. The slides $h$ are provided at one end with jaws $h^3$, in which work pins $t^2$, fixed in the outer ends of short levers or cranks $t^3$, mounted on the shaft $t'$.

The shaft $t'$ is mounted in suitable bearings, $t^4$, on the under side of the top of the box A. On one end of the shaft $t'$ is fixed a lever or crank, $t^5$, jointed at $t^8$ to a rod, $t^6$, carrying a weight, $t^7$. The rod $t^6$ passes down and works through a hole in a bracket, $w^2$, fixed to the partition $w$, dividing the compartments $A'$ and $A^2$ from each other. The lower end of the rod $t^6$ bears on the upper surface of the slide $c$, in front of a strip, $c^4$, on the said slide $c$. The rod $t^6$ operates in a somewhat similar manner to the lever $o$ in the compartment $A'$—that is to say, assuming the delivery-slide $c$ to be shut and the slides $h$ open, as shown in Fig. 6, directly the slide $c$ is moved outward on the insertion of a coin in each of the money-slits $e$, the rod $t^6$ will be caused to mount and ride on the strip $c^4$, thus raising the lever or crank $t^5$, and causing the shaft $t'$ to rotate the levers or cranks $t^3$, the pins $t^2$ of which will cause the slides $h$ to cover the slits $e$. The slides $h$ are closed, when the supply of stamped envelopes, &c., in the apparatus has been exhausted, by means of the extension or arm $r'$ on the rod $r$, carrying the tablet $g$, being caused by the lever $g^2$, rod $v$, and lever $u'$ to move upward when the said tablet is exposed, thereby moving the lever $t$, which partly revolves the shaft $t'$ and levers or cranks $t^3$, thus closing the slides $h$. By thus causing the slide or slides $h$ in each part of the apparatus to move directly either of their respective delivery-slides $c$ is pulled out. It will be seen that should an attempt be made to open one of the said delivery-slides for the purpose of extracting either a post-card or stamped envelope, &c., from the apparatus by means of a knife or other similar instrument inserted in one of the money-slits $e$, so that the said knife or the like shall act instead of a coin to form a resistance to the trigger $i^4$, the said knife will be nipped by the slide $h$, and will thus stop any further movement of the delivery-slide, as the slide $h$ must move over the slit $e$ before the outward movement of the said delivery-slide can be continued.

At C in Fig. 5 I have shown a suitable air dash-pot fixed to the back of the box A, the piston-rod $C'$ of which is fastened to a bracket, $C^2$, on the under side of the delivery-slide in the compartment $A'$. The said dash-pot serves to prevent any severe shock or strain being imparted to the mechanism in case the delivery-slide $c$ should be violently moved to and fro. To allow of access to the boxes $a$ in the compartments $A'$ or $A^2$, when required to replenish the same when exhausted of post-cards or stamped envelopes, &c., I hinge the part B of the lid of the box A, as previously described, and to allow of locking or unlocking the same. I provide a bolt, $x$, working in guides $x'$ on the under side of the part $B'$ of the lid of the said box A, which bolt passes through an eye, $x^2$, fixed to the part B, as shown in Fig. 5. At the other end of the bolt $x$ is fixed a pin, $x^3$, engaging with a slot at the end of a lever, $x^4$, which is fastened on one end of a shaft, $x^5$, journaled in bearings $x^6$, and running along the back of the box A, the other end terminating at the side thereof, a lever, $x^7$, being fixed to the said end. From the lever $x^7$ hangs a rod, $x^8$, extending to a point a little below the top of the opening covered by the door $A^5$, and through which slides the drawer $A^3$. By opening the door $A^5$ and pressing upward the rod $x^8$ the lever $x^7$ will cause the shaft $x^5$ to rotate the lever $x^4$, whereby the bolt $x$ will be withdrawn from the eye $x^2$, thereby unlocking the part B of the lid of the box A.

In each of the skeleton frames or boxes $a$, I have shown an extra compartment for containing cards or the like on which are printed suitable advertisements, &c., the delivery-slides being made of a suitable width for the delivery of the same.

Figure 11:
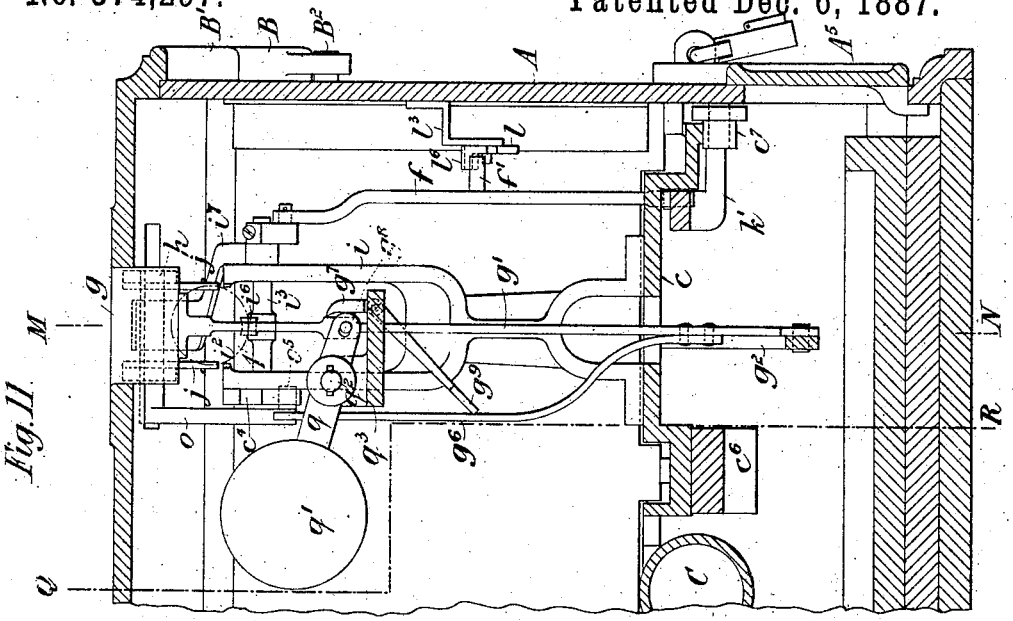
Figure 12:
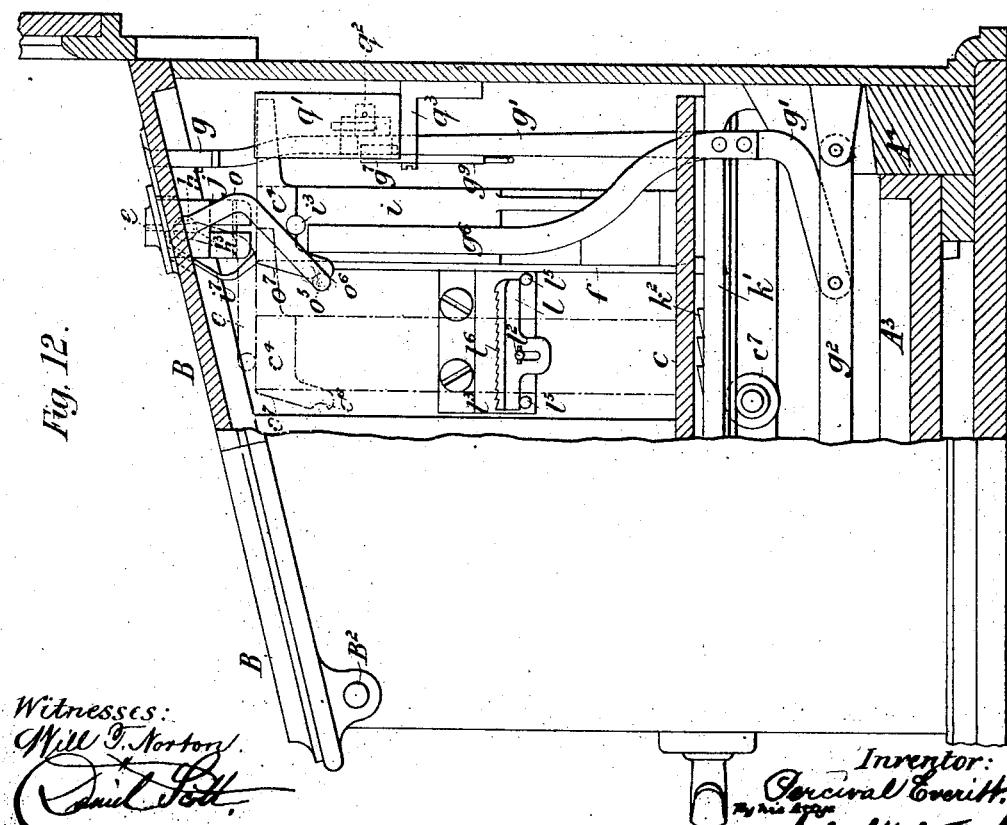

Instead of employing a flat slide, as hereinbefore described, and shown in Figs. 3, 6, and 8, I sometimes use a rotary slide, $h$, as shown in Figs. 10, 11, and 12, the said slide having a longitudinal slot, $h^3$. It is journaled in the guides $j$, and extends along and underneath the slit $e$. To one end of the rotary slide $h$ is attached a cranked arm, $o$, having a pin, $o^5$, projecting from one side of the outer end thereof. The pin $o^5$ rests (when the delivery-slide $c$ is shut) in a notch, $o^6$, in a bracket, $c^4$, fixed on one side of the top of the upright $i$, and extending beyond the rear of the same, the said upright being here shown of a slightly-different shape to that shown in Figs. 3 to 8. When the delivery-slide is drawn out, the pin $o^5$ will be caused to ride out of the notch $o^6$ onto the inclined face $o^7$ of the bracket $c^4$, and a partial rotation of the rotary slide $h$ will be made, thereby closing the slit $e$. On still further pulling out the delivery-slide $c$ the pin $o^5$ on the cranked arm $o$ will be caused to ride up the inclined face $o^7$ of the bracket $c^4$ onto the top thereof, as shown in dotted lines in Fig. 12. In this arrangement I have shown the plate $l$ provided with rack-teeth $l^6$, the pin $f'$ on the locking-bolt $f$ being made of the shape shown in dotted lines in Fig. 10, so as to engage with the said teeth, when the said pin is moved onto the top of the said plate $l$, by drawing out the delivery-slide $c$, thereby preventing any backward movement of the said delivery-slide $c$. In this case I also provide the finger or trigger $i^4$ on the spindle $i^3$ with a backward extension, $i^6$, having its upper face concave, as shown, whereby the coin 1 is prevented from dropping behind the said finger or trigger till such time as the pin $f$ has engaged with the rack-teeth $l^6$ on the loose plate $l$.

The rod $g'$, together with the tablet $g$, is placed behind the money-slit $e$, and the said rod is connected directly to the lever $g^2$, the pin $g^*$, hereinbefore described, and shown in Figs. 3, 4, 5, 7, and 8, being dispensed with. I have also shown the tablet $g$ as not being fixed to the rod $g'$, so that if the said tablet be raised or be fixed in a raised position by any person before the goods in the apparatus are exhausted the rod $g'$ and its connections will not be affected.

In order to close the slit $e$ when the apparatus is exhausted of post-cards, I provide the rod $g'$ with an upward extension, $g^6$, which is normally situated under the cranked arm $o$. When, however, the apparatus is exhausted of post-cards, the said rod $g'$ will rise and the extension $g^6$ will be caused to lift the said cranked arm $o$, thereby rotating the rotary slide $h$ and closing the slit $e$.

In order to prevent the delivery-slides from being opened by inserting a knife in the money-slit $e$, I have shown an upwardly-extending arm, $i^7$, mounted on the spindle $i^3$, the end of which arm is formed so that it can move on the under side of the money-slit $e$. Should a knife or the like be inserted in the said money-slit $e$ for the purpose referred to, the said arm $i^7$ will come against the knife or the like, and thus prevent any movement of the spindle $i^3$, and consequent unlocking of the delivery-slide.

For locking the lever $g^2$ and tablet $g$, I have shown a weighted pawl, $g^7$, which engages with and underneath a shoulder, $g^8$, on the rod $g'$ when the said rod is lifted up to expose the tablet $g$, the said pawl $g^7$ being provided with an extended part, $g^9$, to allow of the said pawl being readily disengaged when a fresh supply of cards or the like is placed in the apparatus.

In my improved apparatus no arrangement is provided for returning coins not of the proper denomination, as I do not consider such provision necessary.

I have described and illustrated my improvements as applied to an apparatus constructed for receiving payment for and for delivering post-cards and stamped envelopes containing letter-paper, and have shown the skeleton frames or boxes adapted also to contain and deliver advertisements with the post-cards and stamped envelopes; but it will be obvious that the apparatus can be constructed to deliver only one description of article, and that it may also be constructed to deliver other articles than post-cards and stamped envelopes—such, for example, as boxes of matches and packets of cigarettes—and that the provision for delivering advertisements can be dispensed with; also, that the shape and proportions of the containing-case may be varied to suit the particular goods to be stored therein for delivery.

The slide in the construction herein described, whereby the postal-card or other object to be delivered is conveyed toward the delivery-opening of the apparatus, consists in the horizontal piece designated herein by the letter C and the upright piece designated herein by the letter $i$, as these parts are one and effect the delivery of the article upon the insertion within the structure of a coin of the requisite denomination.

Having now particularly described and ascertained the nature of my said invention, and in what manner the same is to be performed, I declare that what I claim is—

1. In combination with an apparatus organized to deliver an article of merchandise by the manipulation of a movable part of said apparatus upon the insertion of a coin or token of the requisite standard within a slit or opening provided therefor, a rest arranged beneath the coin or token opening and constructed to receive and support the coin or token and to release the same upon the withdrawal of said movable part of the apparatus, substantially as set forth.

2. In combination with the delivery-slide provided with a coin-rest normally located beneath the coin-receiving aperture, a lock co-operating with the frame of the apparatus, and a trigger whereby the coin is dislodged upon the forward movement of the delivery-slide, substantially as described.

3. In an apparatus of the character herein described, provided with a delivery-slide arranged to be unlocked upon the insertion within a receiving-aperture of a coin or token of the requisite standard, the combination of a rack constituting a part of the locking mechanism, and a drop-plate arranged above the delivery-opening of the apparatus and co-operating with said delivery-slide to prevent more than one article being procured by the payment of one amount, substantially as set forth.

4. In combination, the delivery-slide provided with inclined surfaces, as shown, drop-plate $m$, provided with projecting pieces, as explained, and a rack-bar and its co-operating lock-bolt, substantially as set forth.

5. In combination, the delivery-slide provided with a coin-supporting rest, as $i$, a spindle located at the top of said support, to which is affixed an arm or lever, which carries the locking-bolt, as $f$, and the notched bracket located beneath said delivery-slide, whereby the delivery-slide is locked when closed, substantially as set forth.

6. In an apparatus of the character herein described, provided with a delivery-slide having a coin-support normally located beneath the coin-receiving aperture, the combination of a trigger mounted on a spindle, as $i^3$, a lever co-operating with said spindle and carrying a locking-bolt, as $f$, a notched rack co-operating with said bolt, and the slotted plate $l$, co-operating with a stud on the bolt $f$, substantially as set forth.

7. In combination, slide $h$, pivoted lever $n$, two-armed lever $o$, and connecting mechanism co-operating with the delivery-slide, whereby the money-slit of the apparatus is automatically closed upon the withdrawal of said delivery-slide, substantially as set forth.

8. The slide $h$, rod $g'$, with its incline $g^3$, and lever $p$, combined and co-operating with the bent lever $g^2$, whereby the slide $h$ is caused to close the money-slit when the apparatus is exhausted of the goods which it is designed to deliver, substantially as described.

9. In combination, the weight $b'$, having a solid portion, $b^2$, and slotted bent lever $g^2$, provided upon its end with a pivoted bell-cranked piece, and co-operating with the rod $g'$, lever $p$, and delivery-slide, substantially as set forth.

PERCIVAL EVERITT.

Witnesses:
G. F. REDFERN,
A. ALBUTT.